United States Patent
Rossin et al.

(12) 
(10) Patent No.: US 6,673,326 B1
(45) Date of Patent: Jan. 6, 2004

(54) CATALYTIC PROCESSES FOR THE REDUCTION OF PERFLUORINATED COMPOUNDS AND HYDROFLUOROCARBONS

(75) Inventors: Joseph A. Rossin, Columbus, OH (US); William B. Feaver, Columbus, OH (US)

(73) Assignee: Guild Associates, Inc., Dublin, OH (US)

( * ) Notice: Subject to any disclaimer, the term of this patent is extended or adjusted under 35 U.S.C. 154(b) by 0 days.

(21) Appl. No.: 09/633,609

(22) Filed: Aug. 7, 2000

(51) Int. Cl.⁷ .................................................. A62D 3/00
(52) U.S. Cl. .............................. 423/240 S; 423/245.1; 588/207; 588/248
(58) Field of Search .................. 423/240 S, 245.3, 423/245.1, 239.1; 588/206, 213, 214, 248, 226, 245, 246

(56) References Cited

U.S. PATENT DOCUMENTS

| | | | |
|---|---|---|---|
| 3,760,565 A | 9/1973 | Fish ................................ | 55/71 |
| 3,899,444 A | 8/1975 | Stephens ..................... | 252/455 |
| 3,980,584 A | 9/1976 | Dronov et al. ............... | 252/432 |
| 3,983,072 A | 9/1976 | Stephens ..................... | 252/466 |
| 4,053,557 A | 10/1977 | Kageyama ................... | 423/240 |
| 4,059,683 A | 11/1977 | Lindberg et al. ............. | 423/481 |
| 4,092,403 A | 5/1978 | Rectenwald et al. ......... | 423/488 |
| 4,390,456 A | 6/1983 | Sanchez et al. .............. | 252/448 |
| 4,435,379 A | 3/1984 | Olson et al. .................. | 423/472 |
| 4,459,372 A | 7/1984 | Arenn ........................... | 502/351 |
| 4,587,116 A | 5/1986 | Livingston et al. .......... | 423/415 |
| 4,810,685 A | 3/1989 | Twigg et al. .................. | 502/60 |
| 4,868,150 A | 9/1989 | Spooner et al. .............. | 502/439 |
| 4,902,664 A | 2/1990 | Wan ............................. | 502/300 |
| 5,151,263 A | 9/1992 | Okazaki et al. .............. | 423/659 |
| 5,176,897 A | 1/1993 | Lester .......................... | 423/659 |
| 5,276,240 A | 1/1994 | Timmons et al. ............ | 585/642 |
| 5,276,249 A | 1/1994 | Greene et al. ................ | 588/206 |
| 5,283,041 A | 2/1994 | Nguyen et al. ............... | 423/240 |
| 5,290,429 A | 3/1994 | Delaney et al. .............. | 208/145 |
| 5,396,022 A | 3/1995 | Wu et al. ...................... | 585/852 |
| 5,416,247 A | 5/1995 | Webster ........................ | 588/206 |
| 5,430,230 A | 7/1995 | Mitsui .......................... | 588/206 |
| 5,457,268 A | 10/1995 | Greene et al. ................ | 588/207 |
| 5,593,654 A | 1/1997 | Decker, Jr. et al. .......... | 423/625 |
| 5,622,682 A | 4/1997 | Tom ............................. | 423/230 |
| 5,653,949 A | * 8/1997 | Chen et al. ............... | 423/240 R |
| 5,817,284 A | * 10/1998 | Nakano et al. .............. | 423/219 |
| 5,863,515 A | 1/1999 | Davis et al. .................. | 423/628 |
| 6,022,489 A | 2/2000 | Izumikawa et al. .... | 252/182.32 |
| 6,023,007 A | 2/2000 | Nakajo et al. ................ | 588/205 |
| 6,069,291 A | 5/2000 | Rossin et al. ................ | 588/206 |
| 6,110,436 A | 8/2000 | Scholz et al. ................ | 423/240 |
| 6,162,957 A | * 12/2000 | Nakajo et al. ............... | 423/210 |

FOREIGN PATENT DOCUMENTS

| | | | |
|---|---|---|---|
| EP | 0 475 442 A1 | 12/1998 | ........... B01D/53/36 |
| EP | 0 885 648 A1 | 12/1998 | ........... B01D/53/86 |
| GB | 2 066 690 | 7/1981 | ............ B01J/23/74 |
| JP | 57-7254 | 1/1982 | ............ B01J/23/40 |
| JP | 57-7255 | 1/1982 | ............ B01J/23/60 |
| JP | 07080303 | 3/1995 | ............ B01J/23/24 |
| JP | 9-57103 | 3/1997 | ............ B01J/23/63 |
| JP | 9-253453 | 9/1997 | ........... B01J/53/94 |
| JP | 10-66867 | 3/1998 | ............ B01J/21/16 |
| JP | 10192653 | 7/1998 | ........... B01D/53/86 |

OTHER PUBLICATIONS

Bickle et al, Catalytic Destruction of Chlorofluorocarbons and Toxic Chlorinated Hydrocarbons, Appl. Catal. B:Env., 1994, pp. 141–153, Elsevier, Amsterdam Sep.

Bond & Sadeghi, Catalysed Destruction of Chlorinated Hydrocarbons J. Appl. Chem. Biotechnol. 1975, pp. 241–248, Society of Chemical Industry, London No month.

Burdenuic & Crabtree, Mineralization of Chlorofluorocarbons and Aromatization of Saturated Fluorocarbons by a Convenient Thermal Process, Science, 1996, pp. 340–341, Amer. Assoc. for the Advancement of Science, D.C. Jan.

Fan & Yates, Infared Study of the Oxidation of Hexafluoropropene On $TiO_2$, J. Phys. Chem. 1994, pp. 10621–10627, Americal Chemical Society, Easton, PA No month.

Karmakar & Green, An Investigation of CFC12 ($CCL_2F_2$) Decomposition on $TiO_2$ Catalysts, J. Catal., 1995, pp. 394–406 Academic Press, San Diego No month.

Nagata et al, Catalytic Oxidative Decomposition of Chlorofluorocarbons (CFCs) in the Presence of Hydrocarbons, Applied Catalysts B: Environmental, 1994, pp. 23–31, Elsevier, Amsterdam No month.

Okazaki & Kurosaki; Decomposition of Chlorofluorocarbons by the Reaction with Water Vapor Catalyzed by Iron Oxide Supported on Activated Carbon, pp. 1901–1904, Chemistry Letters, 1989 No month.

European Search Reports PCT/US 99/21376, no date.

Langan, "Strategies for greenhouse gas reduction," *Solid State Technology*, pp. 115–122 (Jul. 1996).

Campbell et al., "Catalytic Oxidation of Perfluorocyclobutene Over a 1% Pt/$TiO_2$," Guild Associates, Inc. (1995) No month.

Farris et al., "Deactivation of a Pt/$Al_2O_x$ Catalyst During the Oxidation of Hexafluoropropylene," *Catalysis Today*, 11, pp. 501–516 (1992) No month.

* cited by examiner

Primary Examiner—Stanley S. Silverman
Assistant Examiner—Edward M. Johnson
(74) Attorney, Agent, or Firm—Baker Botts L.L.P.

(57) ABSTRACT

A process for reducing perfluorinated compounds and/or hydrofluorocarbon compounds in a sample uses a catalyst made from aluminum oxide ($Al_2O_3$), and one or more enhancers selected from the group consisting of nickel, cobalt, and sulfate. Another useful catalyst comprises zirconium oxide ($ZrO_2$) and/or aluminum oxide ($Al_2O_3$) and nickel as an enhancer.

27 Claims, 1 Drawing Sheet

CATALYTIC PROCESSES FOR THE REDUCTION OF PERFLUORINATED COMPOUNDS AND HYDROFLUOROCARBONS

BACKGROUND OF THE INVENTION

The government may own rights in the present invention pursuant to grant number DMI-9531289 from the National Science Foundation.

FIELD OF THE INVENTION

The invention relates to catalysts and catalytic processes for the degradation of perfluorinated compounds and hydrofluorocarbons.

Perfluorinated compounds (PFCs) are used extensively in the manufacture of semiconductor materials, such as dry chemical etching and chamber cleaning processes. PFCs are defined as fully fluorinated compounds made of carbon, nitrogen, or sulfur, or mixtures thereof. Examples of PFCs include nitrogen trifluoride ($NF_3$), tetrafluoromethane ($CF_4$), hexafluoroethane ($C_2F_6$), sulfur hexafluoride ($SF_6$), octafluoropropane ($C_3F_8$), decafluorobutane ($C_4F_{10}$), and octafluorocyclobutane (c-$C_4F_8$).

Hydrofluorocarbons (HFCs) are also used in the manufacture of semiconductor material and are generated as by-products during semiconductor manufacture. HFCs are compounds made of hydrogen, fluorine and carbon. Examples of HFCs include trifluoromethane ($CHF_3$) and 1,1,1,2-tetrafluoroethane ($CF_3CFH_2$). The global warming potential of PFC and HFC compounds are estimated to be many times greater than that of carbon dioxide (Langan et al., 1996), resulting in a need for economical technologies for achieving emissions control requirements. Other applications for PFCs and HFCs include uses as polymer blowing agents and as refrigerants.

Catalytic technologies have been and continue to be widely used as an "end-of-the-pipe" means of controlling industrial emissions. This technology involves passing a contaminated stream over a catalyst in the presence of oxygen and/or water at an elevated temperature to convert the pollutants in the emissions stream to carbon dioxide, water, and mineral acids, should the parent compounds contain halogens. This technology offers many advantages over thermal incineration as a means of controlling emissions. The advantages are connected to the use of the catalyst, which reduces the temperature required to decompose the pollutants by several hundreds of degrees Celsius. These advantages include energy savings (which translates into lower operating costs), lower capital costs, small foot print of resulting abatement unit, a more controllable process, and no generation of thermal $NO_x$.

An important factor in any catalytic abatement strategy is the catalyst itself. The catalytic destruction of PFCs and HFCs results in the formation of highly corrosive fluorine-containing products, such as $F_2$, HF and/or $COF_2$. In order for a catalyst to effectively decompose PFCs and HFCs, the catalyst must be able to maintain its integrity in the resulting highly corrosive environment. Many typical catalytic materials will not maintain their integrity in this reaction environment due to fluorine attack.

Campbell and Rossin ("Catalytic Oxidation of Perfluorocyclobutene over a $Pt/TiO_2$ Catalyst," 14th N. Am. Catal. Soc. Meeting, 1995) suggested the use of a $Pt/TiO_2$ catalyst to destroy perfluorocyclobutene (c-$C_4F_6$) at reaction temperatures between 320° C. and 410° C. The authors reported some loss of reactivity over the duration of the near 100 hour reaction exposure. The authors also note the beneficial effects of water on improving the stability of the catalyst. The authors stated that even at a reaction temperature of 550° C., the catalyst did not decompose perfluorocyclobutane (c-$C_4F_8$), a PFC used in the manufacture of semiconductor materials. Results presented in this study suggested that perfluoroalkanes are significantly more difficult to destroy than the corresponding perfluoroalkene.

Aluminum oxide, particularly of the high surface area gamma phase, is widely used as a support for catalytically active metals. Aluminum oxide offers a combination of high surface area and excellent thermal stability, being able to maintain its integrity at temperatures of approximately 800° C. for short periods of time. Aluminum oxides however, do not fare well as catalyst supports for the destruction of fluorine-containing compounds. For example, Farris et al. ("Deactivation of a $Pt/Al_2O_3$ Catalyst During the Oxidation of Hexafluoropropylene," Catal., Today, 501, 1992) report the destruction of hexafluoropropylene over platinum supported on a high surface area aluminum oxide catalyst. It was not reported whether the platinum or the aluminum oxide is responsible for the destruction of hexafluoropropylene. The catalyst could readily destroy hexafluoropropylene at reaction temperatures between 300° C. and 400° C.; however, severe deactivation of the catalyst was noted. Over the course of the experiment (less than 100 hours), the aluminum oxide was converted to aluminum trifluoride, which resulted in a severe loss of catalytic activity. This transformation of the aluminum oxide to aluminum trifluoride suggests that aluminum oxide will not be able to maintain its integrity in a fluorine environment for an extended period of operation.

Thus, there exists a need for novel and improved catalysts and catalytic processes for the degradation of perfluorinated compounds and hydrofluorocarbon compounds.

SUMMARY OF THE INVENTION

Catalyst compositions containing $Al_2O_3$ and/or $ZrO_2$ along with one or more enhancers are described. The enhancers may be nickel, cobalt, or sulfate. The catalyst compositions may further contain an oxidation catalyst such as platinum, palladium, rhodium, iridium, silver, nickel, copper, iron, vanadium, or cerium.

The catalyst compositions are particularly useful in catalytic processes for the destruction of perfluorinated compounds and/or hydrofluorocarbons.

DESCRIPTION OF THE FIGURES

The following figures form part of the present specification and are included to further demonstrate certain aspects of the present invention. The invention may be better understood by reference to one or more of these drawings in combination with the detailed description of specific embodiments presented herein.

| FIG. | Description |
| --- | --- |
| 1 | Catalytic degradation of $CHF_3$ by $Al_2O_3$ (diamond symbols) and by $Al_2O_3$—$SO_4$ (square symbols). Data is from Tables 2 and 6. Temperature is ° C. |
| 2 | Catalytic degradation of $CF_4$ by $ZrO_2$ (diamond symbols) and by $ZrO_2$—$SO_4$ (square symbols). Data is from Tables 3 and 4. Temperature is ° C. |

DEFINITIONS

Figure 1:
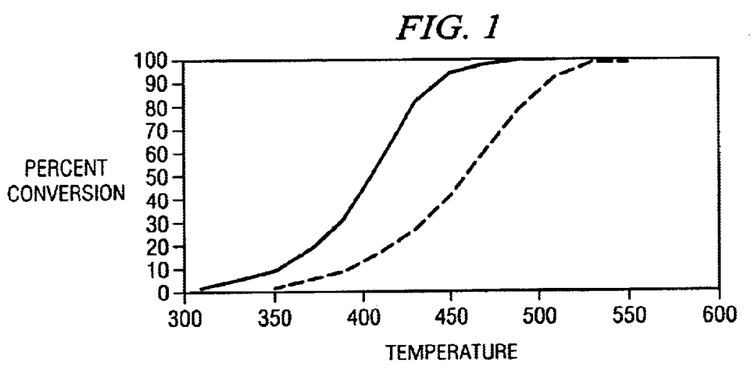
Figure 2:
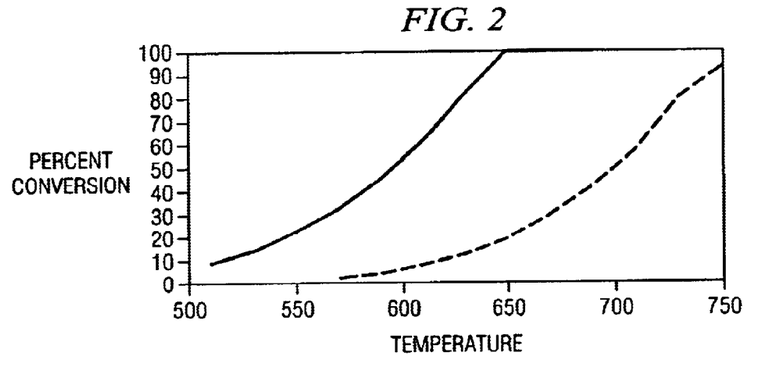

The following definitions are provided in order to aid those skilled in the art in understanding the detailed description of the present invention.

"GHSV" refers to gas hourly space velocity, commonly measured in $hr^{-1}$ units.

"Hydrofluorocarbons" (HFCs) refers to chemical compounds made of hydrogen, fluorine, and carbon (i.e. $C_aH_bF_c$, where a, b, and c are non-negative integers).

"Nl" refers to normal liter, defined as one liter of gas at one atmosphere pressure and 0° C. temperature.

"Oxidation catalyst" refers to materials that can catalyze the oxidation of carbon-containing compounds to carbon dioxide and other oxidized reaction products, if any, in the presence of an oxidizing agent.

"Perfluorinated compounds" (PFCs) refers to fluorinated chemical compounds made of carbon, nitrogen, sulfur, or mixtures thereof (i.e. $C_aN_bS_cF_d$, where a, b, c, and d are non-negative integers).

DETAILED DESCRIPTION OF THE INVENTION

The present invention relates to catalysts and catalytic processes for the degradation of PFCs and/or HFCs. The PFCs and/or HFCs are preferably degraded into HF and oxides. Carbon dioxide will be formed from parent compounds containing carbon. PFCs that do not contain carbon, e.g. $SF_6$, will be converted into HF plus oxides of sulfur.

Oxides of aluminum and zirconium are able to decompose PFCs and HFCs. Unfortunately, these materials are rapidly deactivated during exposure to PFCs and/or HFCs, and are therefore not suitable for commercial applications. Deactivation results from a transformation of the oxides of aluminum and/or zirconium into the corresponding fluoride form. For example, aluminum oxide is rapidly deactivated during the destruction of PFCs and HFCs due to the aluminum oxide being transformed into aluminum trifluoride.

Described herein are catalyst compositions and catalytic processes using oxides of aluminum and/or zirconium which decompose PFCs and HFCs, and which have good stabilities.

Catalyst Compositions

In a preferred embodiment, the catalyst composition generally comprises one or more oxides selected from the group consisting of $ZrO_2$ and $Al_2O_3$; and one or more enhancers selected from the group consisting of nickel, cobalt, and sulfate. The weight percent of the enhancer can generally be any weight percent, and preferably is about 2 weight percent to about 50 weight percent. The weight percent of the enhancer may alternatively be less than about 2 weight percent, or less than about 1 weight percent. In a preferred embodiment, the concentration of sulfate in the catalyst composition is preferably about 2 weight percent to about 10 weight percent. In a preferred embodiment, the concentration of nickel in the catalyst composition is preferably about 2 weight percent to about 30 weight percent. In a preferred embodiment, the concentration of cobalt in the catalyst composition is preferably about 2 weight percent to about 30 weight percent. The source of nickel is generally any nickel salt, and preferably is nickel oxide, nickel nitrate, or nickel acetate. The source of cobalt is generally any cobalt salt, and preferably is cobalt oxide, cobalt acetate, or cobalt nitrate. The source of sulfate is generally any sulfate salt or compound such as ammonium sulfate or aluminum sulfate, and preferably is sulfuric acid.

The enhancer preferably improves the life-time of the catalyst composition as compared to the corresponding catalyst composition lacking the enhancer, under conditions where the catalyst is contacted with HFCs or PFCs. The life-time of the catalyst composition divided by the life-time of the corresponding catalyst composition lacking the enhancer is preferably at least about 1.5, at least about 2, at least about 3, at least about 4, at least about 5, at least about 10, at least about 20, at least about 30, at least about 40, at least about 50, at least about 75, or at least about 100. The enhancer preferably does not decrease the catalytic activity of the catalyst composition as compared to the catalytic activity of the corresponding catalyst composition lacking the enhancer. If the enhancer does decrease the catalytic activity of the catalyst composition, it preferably decreases the catalytic activity no more than 10%, more preferably no more than 5%, most preferably no more than 2%, and ideally does not decrease the catalytic activity of the catalyst composition. Particularly preferred are enhancers that both improve the life-time and increase the catalytic activity of the catalyst composition as compared to the corresponding catalyst composition lacking the enhancer.

In one preferred embodiment, the catalyst composition preferably contains both $ZrO_2$ and $Al_2O_3$. The weight percentages of $ZrO_2$ and $Al_2O_3$ can be the same or different.

Mixed catalyst compositions containing primarily $Al_2O_3$ preferably contain about 2 weight percent $ZrO_2$ to about 15 weight percent $ZrO_2$. The compositions may contain about 2 weight percent $ZrO_2$ to about 10 weight percent $ZrO_2$, about 2 weight percent $ZrO_2$ to about 5 weight percent $ZrO_2$, about 5 weight percent $ZrO_2$ to about 15 weight percent $ZrO_2$, or about 10 weight percent $ZrO_2$ to about 15 weight percent $ZrO_2$.

Mixed catalyst compositions containing primarily $ZrO_2$ preferably contain about 2 weight percent $Al_2O_3$ to about 20 weight percent $Al_2O_3$. The compositions may contain about 2 weight percent $Al_2O_3$ to about 20 weight percent $Al_2O_3$, about 5 weight percent $Al_2O_3$ to about 20 weight percent $Al_2O_3$, about 10 weight percent $Al_2O_3$ to about 20 weight percent $Al_2O_3$, about 2 weight percent $Al_2O_3$ to about 15 weight percent $Al_2O_3$, about 2 weight percent $Al_2O_3$ to about 10 weight percent $Al_2O_3$, about 5 weight percent $Al_2O_3$ to about 20 weight percent $Al_2O_3$, about 10 weight percent $Al_2O_3$ to about 20 weight percent $Al_2O_3$, or about 10 weight percent $Al_2O_3$ to about 15 weight percent $Al_2O_3$. An example of a mixed catalyst composition is: $Al_2O_3$ (about 2 weight percent to about 15 weight percent)—nickel ion (about 5 weight percent to about 25 weight percent)—$ZrO_2$ (balance).

In an alternative embodiment, the catalyst composition further comprises an oxidation catalyst. In a preferred embodiment, catalyst compositions which do not contain either nickel or cobalt may further comprise an oxidation catalyst. The concentration of the oxidation catalyst can generally be any weight percent, and preferably is up to about 10 weight percent of the catalyst composition. The concentration of the oxidation catalyst may alternatively be up to 1 weight percent, up to 2 weight percent, up to 3 weight percent up to 4 weight percent up to 5 weight percent, up to 6 weight percent, up to 7 weight percent, up to 8 weight percent, or up to 9 weight percent. The oxidation catalyst can generally be any oxidation catalyst suitable for catalyzing the conversion of carbon monoxide to carbon dioxide. The oxidation catalyst can be platinum, palladium, rhodium, iridium, silver, nickel, copper, iron, vanadium, or cerium. Preferably the oxidation catalyst is platinum. The oxidation catalysts may be elemental metals (e.g. platinum metal or palladium metal), or salts or complexes of the metals (e.g. platinum chloride or palladium acetate).

Small concentrations of impurities, contaminants, or inert materials are not expected to substantially change the properties or utility of the above described catalyst compositions. The above described catalysts can comprise their indicated components, consist essentially of their indicated components, or consist of their indicated components.

Preparation of Catalyst Compositions

There are a number of methods in which the catalyst can be prepared using techniques known to one skilled in the art.

A predominantly aluminum oxide catalyst can be prepared by combining aluminum oxide or an aluminum compound capable of being converted to aluminum oxide with soluble forms of zirconium, nickel and/or cobalt in an aqueous or non-aqueous slurry. The slurry is then peptized through the addition of a peptizing agent (e.g. nitric acid, formic acid, sulfuric acid, or acetic acid) to form a gel. The gel is then dried and calcined to yield the product catalyst. If desired, the gel can be aged for an extended period of time, such as from less than about 1 hour to about 30 days. Preferably, when the catalyst contains cobalt, it is desirable to calcine the catalyst at temperatures from about 600° C. to about 1000° C. It is believed that, at temperatures greater than about 600° C., cobalt complexes with the aluminum oxide. This calcined product has a deep blue color, versus a black color for cobalt oxide ($Co_3O_4$). The catalyst can also be prepared by impregnating $Al_2O_3$ (e.g. gamma phase, delta phase, eta phase, chi phase, etc.) with a solution containing water soluble forms of zirconium, nickel and/or cobalt (added as salts or complexes). Alternatively, a combination of these techniques can be employed. When it is desired to add sulfate to the catalyst, it is preferable to add the sulfate during preparation of the aluminum oxide. Alternatively, sulfate can be added by impregnating the aluminum oxide with sulfuric acid, then calcining the resulting material.

A preferred method for preparing a predominantly aluminum based catalyst is to combine aluminum oxide or an aluminum compound that can be converted to aluminum oxide with a water soluble form of zirconium, then peptize the resulting material using a peptizing agent (e.g. nitric acid, formic acid, sulfuric acid, or acetic acid). The resulting gel is then optionally aged, dried, and calcined to yield a zirconium-aluminate. If it is desired to add sulfate to the catalyst, it is preferred that the sulfate be added to the gel as a peptizing agent (e.g. as sulfuric acid, zirconium oxysulfate, or aluminum sulfate). The product zirconium-aluminum oxide (that can optionally contain sulfate) is then impregnated with a solution containing soluble forms of cobalt and or nickel, dried and calcined.

A predominantly zirconium oxide catalyst can be prepared by combining zirconium oxide or a zirconium material that can be converted to zirconium oxide with soluble forms of aluminum, nickel, and/or cobalt in an aqueous or non-aqueous slurry. The resulting slurry is then dried and calcined to yield the product catalyst. If desired, the slurry can be aged for an extended period of time such as from less than about 1 hour to about 30 days. The catalyst can also be prepared by impregnating zirconium oxide ($ZrO_2$) with a solution containing water soluble forms of zirconium, nickel, and/or cobalt. Alternatively, a combination of these techniques can be employed. When it is desired to add sulfate to the catalyst, the sulfate is preferably added during preparation of the catalyst. Alternatively, sulfate can be added by impregnating the zirconium oxide with sulfuric acid, then calcining the resulting material.

A preferred method for preparing a predominantly zirconium oxide catalyst is to add the water soluble form of aluminum, nickel, and/or cobalt to an aqueous slurry of the zirconium source. If desired, sulfate (preferably as $H_2SO_4$) is added to the slurry.

Suitable forms of aluminum include aluminum nitrate, pseudo-boehmite, aluminum isopropoxide, sodium aluminate, aluminum triformate, and aluminum trichloride. Aluminum nitrate and p-boehmite are preferable aluminum sources. When desired, aluminum oxide can be used as the aluminum source. Aluminum oxide can be of several phases, such as gamma, chi, eta, theta, delta and kappa. The gamma phase is preferred.

Suitable forms of zirconium include zirconium oxynitrate, zirconium hydroxide, zirconium dioxide, zirconium oxychloride, and zirconium isopropoxide. Zirconium oxynitrate and zirconium hydroxide are the preferred zirconium precursors.

Cobalt sources include cobalt oxide, cobalt acetate, and cobalt nitrate. Cobalt acetate and cobalt nitrate are preferable forms of cobalt due to their ease of impregnation.

Nickel sources include nickel oxide, nickel nitrate, and nickel acetate. Nickel acetate and nickel nitrate are preferable forms of nickel due to their ease of impregnation.

If desired, an oxidation function can be added to the catalyst. The oxidation function can include any element or elemental oxide, or mixtures thereof, that catalyze an oxidation reaction. Examples of oxidizing function materials include platinum, palladium, rhodium, iridium, silver, nickel, copper, iron, vanadium, and cerium. Platinum is a preferred oxidation function due to its broad reactivity. These elements can be added to the catalyst using techniques known to one skilled in the art, for example, by wet impregnation. The oxidation function may be impregnated onto the catalyst for the purpose of oxidizing materials other than PFCs or HFCs in the process stream, for example, hydrocarbons, carbon monoxide, or other oxidizing reaction products formed during the destruction of PFCs and HFCs.

Materials that make up the catalyst are preferably highly dispersed throughout the catalyst. Dispersion may be measured by any generally accepted method, including chemisorption, x-ray, and XPS.

Catalytic Processes

Additional embodiments of the invention are catalytic processes using the above described catalyst compositions.

A process for reducing the concentration of perfluorinated compounds or hydrofluorocarbon compounds in a sample can comprise: providing a source sample comprising one or more perfluorinated compounds, one or more hydrofluorocarbon compounds, or a combination thereof; and contacting the source sample with a catalyst to produce a reacted sample; wherein the catalyst comprises one or more oxides selected from the group consisting of $ZrO_2$ and $Al_2O_3$; and one or more enhancers selected from the group consisting of nickel, cobalt, and sulfate. The result of the process is that the concentration of perfluorinated compounds and hydrofluorocarbon compounds in the reacted sample is less than the concentration of perfluorinated compounds and/or hydrofluorocarbon compounds in the source sample.

The perfluorinated compound(s) in the source sample can generally be any perfluorinated compound or mixtures thereof, and preferably are nitrogen trifluoride ($NF_3$), tetrafluoromethane ($CF_4$), hexafluoroethane ($C_2F_6$), sulfur hexafluoride ($SF_6$), octafluoropropane ($C_3F_8$), decafluorobutane ($C_4F_{10}$), or octafluorocyclobutane (c-$C_4F_8$).

The hydrofluorocarbon compound(s) in the source sample can generally be any hydrofluorocarbon compound or mixtures thereof, and preferably are trifluoromethane ($CHF_3$) or 1,1,1,2-tetrafluoroethane ($CF_3CFH_2$).

The catalyst compositions used in the catalytic processes can generally be any of the catalyst compositions described herein.

The contacting step can generally be performed at any temperature, and preferably is performed at a temperature of about 150° C. to about 900° C., about 200° C. to about 800° C., about 250° C. to about 700° C., 250° C. to about 600° C., about 250° C. to about 500° C., about 300° C. to about 500° C., about 400° C. to about 500° C., about 450° C. to about 500° C., or about 500° C.

The source sample can further comprise oxygen or air. The source sample can further comprise water or a hydrocarbon.

The catalytic processes can generally be performed at any concentration of perfluorinated compounds and hydrofluorocarbon compounds in the source sample. The concentration of perfluorinated compounds and hydrofluorocarbon compounds in the source sample is preferably about 50,000 ppm or less, 40,000 ppm or less, 30,000 ppm or less, 20,000 ppm or less, 10,000 ppm or less, and more preferably about 5,000 ppm or less, about 2,500 ppm or less, about 2,000 ppm or less, about 1,500 ppm or less, about 1,000 ppm or less, about 500 ppm or less, about 250 ppm or less, or about 100 ppm or less.

The catalytic process can further comprise removing or reducing the concentration of catalyst poisons (e.g. silicon tetrafluoride) from the source sample prior to the contacting step. This additional step can generally involve the use of any chemical compound or mechanical unit suitable to remove or reduce the concentration of the catalyst poison, and preferably is dry scrubbing and water scrubbing.

The catalytic process can further comprise removing hydrofluoric acid from the reacted sample. If the concentration of hydrofluoric acid in the reacted sample is to be reduced, conventional collection or abatement processes, such as caustic scrubbing, can be employed to avoid venting hydrofluoric acid gases directly into the atmosphere.

The catalytic process can further comprise removing or reacting carbon monoxide from the reacted sample. Preferably, carbon monoxide is oxidized to carbon dioxide by adding an oxidizing function to the catalyst.

The source sample is preferably in the form of a gas stream. Alternatively, the source sample may be in the form of a liquid stream, a mixed liquid/gas stream, a sprayed stream, or a gel. The source sample is a gas stream when exposed to the catalyst; liquid streams can be treated by vaporizing the stream into an air stream at sufficient temperature.

The reduction in the concentration of perfluorinated compounds and hydrofluorocarbon compounds in the reacted sample as compared to the concentration of perfluorinated compounds and hydrofluorocarbon compounds in the source sample can generally be any reduction, preferably is greater than about 50%, more preferably is greater than about 75%, greater than about 85%, greater than about 95%, greater than about 98%, greater than about 99%, and ideally is about 100%. The reduction in the concentration of perfluorinated compounds and hydrofluorocarbon compounds may be measured by any generally accepted means, such as with a gas chromatograph, an infrared detector, or a mass spectrometer.

The gas hourly space velocity (GHSV) of the system is preferably between about 300 $hr^{-1}$ and about 36,000 $hr^{-1}$ and more preferably between about 1,800 $hr^{-1}$ and about 9,000 $hr^{-1}$. The contacting step is preferably performed in a humid environment. The water content of the gas stream may be between about 0.1% and about 20%, between about 1% and about 5%, between about 5% and about 10%, between about 10% and about 15%, or between about 15% and about 20%.

The catalyst can be used in any configuration or size that exposes the catalyst to the gas stream being treated. The catalyst can be configured in many typical and well-known forms, for example, as pellets, granules, rings, spheres, or cylinders. Alternatively, the catalyst can take the form of a coating on an inert carrier, such as ceramic foams, spheres, or monoliths. The monolithic form may be preferred when it is desired to reduce the pressure drop through the system or minimize attrition or dusting. Alternatively, the catalyst can be extruded into a monolithic form.

The destruction of PFCs and HFCs is believed to proceed according to a catalyzed hydrolysis reaction, where the decomposition of the PFC or HFC involves an interaction between itself and water absorbed onto the surface of the catalyst. According to this mechanism, water is preferably present for the degradation of the PFC or HFC. At a minimum, the concentration of water in the process stream should be sufficient to convert all the fluorine associated with the PFCs and/or HFCs in the process stream to HF. The minimum amount of water is determined by reaction stoichiometry. One atom of hydrogen is required for every atom of fluorine in order to generate HF. For example, 2 molecules of water are the minimum required amount necessary to convert one molecule of $CF_4$ to $CO_2$ and 4 HF. In situations involving HFCs where there is sufficient hydrogen associated with the parent compound to convert all the fluorine to HF (e.g. $CH_3F$), it is not necessary to add water to the system. It is preferable that excess water (e.g. greater than 1% above the minimum amount of water necessary for the stoichiometric conversion of the target compound) is present in the process stream, as excess water may aid in stabilizing the catalyst.

The catalyst is capable of operating over a range of water concentrations, up to operating in pure steam. Water can be added directly, or alternatively, water can be added indirectly through the addition of hydrocarbons, which upon decomposition will yield carbon dioxide and water as reaction products.

In a preferred embodiment, an oxidizing agent is present in the process stream. The oxidizing agent can generally be any oxidizing agent, and preferably is air or oxygen. Other oxidizing agents such as ozone, $N_2O$, $NO_x$ may be used, but may be less preferred due to safety or environmental issues. The destruction of PFCs and HFCs can yield significant amounts of carbon monoxide as a reaction product. The addition of an oxidizing agent to the process stream can result in the conversion of carbon monoxide to carbon dioxide.

The process described herein is also applicable to the injection of gaseous or liquid phase PFCs and/or HFCs, or mixtures thereof, into a gas stream containing inert compounds (e.g. nitrogen) and water, and preferably further containing an oxidizing agent (e.g. air). The gas stream temperature, flow rate, and rate of PFC and/or HFC injection, can be adjusted to allow for the desired concentration of these compounds to be achieved. The concentration of perfluorinated compounds and hydrofluorocarbon compounds in the source sample is preferably about 50,000 ppm or less, 40,000 ppm or less, 30,000 ppm or less, 20,000 ppm or less, 10,000 ppm or less, and more preferably about 5,000 ppm or less, about 2,500 ppm or less, about 2,000 ppm or less, about 1,500 ppm or less, about 1,000 ppm or less, about 500 ppm or less, about 250 ppm or less, or about 100 ppm or less. The resulting gas stream containing the PFCs and/or HFCs can be contacted with the catalyst described herein.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Methods and Measurements

The compositions of the catalysts reported in the Examples are stated in percent by weight with respect to aluminum oxide ($Al_2O_3$) or zirconium oxide ($ZrO_2$), or zirconium aluminum oxide ($ZrO_2$—$Al_2O_3$) when both elements are employed in the catalyst. Catalyst compositions were calculated based upon the concentration of the element in the precursor. When the metal component or components were added by wet impregnation techniques, the weight percent of the metal component(s) were calculated from the concentration of metal(s) within the impregnation solution and the amount of impregnation solution used to prepare the catalyst. In the case of sulfate, the amount of sulfate associated with the catalyst was determined using spectroscopic chemical analysis techniques.

The concentration of carbon monoxide, carbon dioxide and PFCs and HFCs in the reactor effluent in the Examples were determined using gas chromatographic techniques employing packed columns and both thermal conductivity and flame ionization detectors. This analytical technique is well known in the art. HF was analyzed using infrared techniques. $F_2$ was analyzed using mass spectroscopy techniques.

Example 2

Aluminum Oxide Catalyst Degradation of $C_2F_6$

Aluminum oxide was prepared by first adding approximately 12.0 liters of deionized (DI) water to a 5 gallon vessel and stirring with a laboratory scale mixer. 3.0 kg of pseudo-boehmite alumina (70 wt % $Al_2O_3$) was slowly added to the water while stirring. The pH slurry was then adjusted to approximately 3.3 using nitric acid, and the slurry was allowed to stir for four hours. Once complete, the slurry was covered and allowed to age for 18 hours. Following aging, the resulting gel was poured into a drying pan. The drying pan containing the gel was placed into an oven at 110° C. until dry. Following drying, the resulting solids were calcined by heating to 535° C., with the final temperature maintained for three hours. Approximately 2.1 kg of product $Al_2O_3$ was obtained. The resulting material was crushed and sieved to 6/12 mesh particles.

The catalyst as 6/12 mesh particles was evaluated for reactivity by placing 150 cm³ in a 3.8 cm i.d. stainless steel reactor. The stainless steel reactor was housed in a two-zone tube furnace. The catalyst was heated to 800° C. in humid air (3.1% $H_2O$) flowing at 4.5 Nl/min (GHSV=1,800). Once at 800° C., 1,000 ppm (v/v) of $C_2F_6$ was introduced into the process stream. This condition was maintained for one hour, at which time the catalyst temperature was decreased at a rate of 60° C./hr. Every 20 minutes (20° C. temperature intervals), the effluent stream was sampled for the concentration of carbon monoxide, carbon dioxide, and $C_2F_6$ using a gas chromatograph. Table 1 below reports the conversion of $C_2F_6$ as a function of reaction temperature.

TABLE 1

| Conversion of $C_2F_6$ using $Al_2O_3$ catalyst | |
|---|---|
| Temperature | Conversion of $C_2F_6$ |
| 800 | >99.9% |
| 780 | >99.9% |
| 760 | >99.9% |
| 740 | >99.9% |
| 720 | 99.1% |
| 700 | 96.8% |
| 680 | 91.7% |
| 660 | 81.7% |
| 640 | 68.8% |
| 620 | 52.7% |
| 600 | 38.5% |
| 580 | 26.2% |
| 560 | 15.4% |
| 540 | 9.0% |
| 520 | 3.6% |
| 500 | 1.6% |

Reaction products consisted primarily of carbon dioxide with small amounts (up to 200 ppm) of carbon monoxide also detected.

Example 3

Aluminum Oxide Catalyst Degradation of $CHF_3$

The catalyst prepared in Example 2 ($Al_2O_3$) was evaluated for its ability to destroy 3,000 ppm $CHF_3$ in humid air. Using the reactor described in Example 1, 50 cm³ of 6/12 mesh particals were loaded into the reactor, heated to 550° C., and exposed to 3,000 ppm $CHF_3$ in flowing humid (3.0% $H_2O$) air , at 7.5 Nl/min (GHSV of (9,000 hr⁻¹). The catalyst was cooled at 60° C./hr, with the effluent stream being sampled for the concentration of carbon dioxide, carbon monoxide and $CHF_3$ every 20° C. temperature interval. Results of this test are reported in Table 2.

TABLE 2

| Conversion of $CHF_3$ using $Al_2O_3$ catalyst | |
|---|---|
| Temperature ° C. | Conversion of $CHF_3$ |
| 550 | >99% |
| 530 | 99% |
| 510 | 93% |
| 490 | 78% |
| 470 | 60% |
| 450 | 42% |
| 430 | 27% |
| 410 | 17% |
| 390 | 9% |
| 370 | 5% |
| 350 | 2% |

Up to 200 ppm carbon monoxide was detected in the effluent stream.

Example 4

Stability of Aluminum Oxide Catalyst

The catalyst of Example 2 ($Al_2O_3$) was evaluated for stability by loading 50 cm³ of 6/12 mesh catalyst particles in a 3.8 cm i.d. reactor and placing the reactor into a tube furnace. The reactor was heated to 785° C. in humid air (3.5% $H_2O$) flowing, at 4.5 Nl/min (GHSV=5,400 $hr^{-1}$). Once heated, $C_2F_6$ was introduced into the process stream at 9 Nml/minute, which is sufficient to achieve a concentration of 2,000 ppm $C_2F_6$ (v/v). The effluent stream was sampled every two hours for the concentration of $C_2F_6$, carbon monoxide and carbon dioxide using a gas chromatograph. The conversion of $C_2F_6$ decreased from greater than 95% to 80% throughout the duration of the 30 hour reaction exposure. Carbon containing reaction products consisted of carbon dioxide, with small amounts (about 100 to 150 ppm) of carbon monoxide also detected. XPS analysis of the spent catalyst confirmed a transformation of the aluminum oxide to aluminum trifluoride.

$Al_2O_3$ catalyst prepared according to Example 2 was evaluated for stability against a mixed feed stream of $C_2F_6$ and $SF_6$. 50 $cm^3$ of 6/12 mesh $Al_2O_3$ catalyst was loaded into a 3.8 cm i.d. reactor and placed into a tube furnace. The reactor was heated to 798° C. in humid air (3.5% water) flowing at 4.5 Nl/min. Once at reaction temperature, 6.75 Nml/min each $SF_6$ and $C_2F_6$ were introduced into the humid air stream (to yield 1,500 ppm $SF_6$ and 1,500 ppm $C_2F_6$ in humid air). The conversion of $C_2F_6$ decreased from over 95% to 65% and the conversion of $SF_6$ decreased from greater than 99.5% to less than 95% over the duration of the 15 hour reaction exposure.

Example 5

Zirconium Dioxide Catalyst

Zirconium dioxide was prepared by calcining powdered zirconium hydroxide at 550° C. for 2 hours. The resulting $ZrO_2$ powder was pressed into wafers, then crushed and sieved into 20/40 mesh catalyst particles.

2.0 $cm^3$ of particles were placed in a 1.0 cm o.d. stainless steel reactor. The reactor was placed in a tube furnace and heated to an elevated temperature (750° C. for $CF_4$, 450° C. for $CF_3CH_2F$), and the catalyst was exposed to flowing reactant (either 1,000 ppm $CF_4$ or 1,000 ppm $CF_3CH_2F$) in humid (3.0% water) air. The test with $CF_3CH_2F$ was performed with a flow rate of 300 Nml/min (GHSV of 9,000 $hr^{-1}$). The test with $CF_4$ was performed with a flow rate of 60 Nml/min (GHSV of 1,800 $hr^{-1}$). Once stable, the reaction temperature was decreased at a rate of 60° C./hr, with the effluent stream sampled for reactant chemical and carbon monoxide and carbon dioxide at 20° C. temperature intervals. Table 3 reports the conversion of each reactant chemical as a function of temperature.

TABLE 3

Conversion of $CF_4$ and $CF_3CHF_2$ by $ZrO_2$ catalyst

| Temperature ° C. | Conversion of $CF_4$ | Temperature ° C. | Conversion of $CF_3CHF_2$ |
| --- | --- | --- | --- |
| 750 | 96% | 450 | 96% |
| 730 | 82% | 430 | 81% |
| 710 | 59% | 415 | 63% |
| 690 | 43% | 400 | 43% |
| 670 | 30% | 385 | 25% |
| 650 | 19% | 370 | 14% |
| 630 | 12% | 355 | 8% |
| 610 | 7% | 340 | 4% |
| 590 | 4% | 325 | 2% |
| 570 | 2% | | |

High concentrations, up to 600 ppm of carbon monoxide were detected in the effluent stream for both compounds.

Example 6

Stability of Zirconium Dioxide Catalyst

The $ZRO_2$ catalyst described in Example 5 was evaluated for stability by exposing 2.0 $cm^3$ of catalyst to 1,000 ppm $CF_4$ in flowing humid (3.9% water) air at a GHSV of 1,800 $hr^{-1}$. Following 12 hours at 750° C., the conversion of $CF_4$ decreased from 95% to 35%.

The $ZrO_2$ catalyst described in Example 5 was further evaluated for stability by exposing the catalyst to 1,000 ppm $CF_3CH_2F$ in flowing humid (3.9% water) air at a GHSV of 9,000 $hr^{-1}$. Following 24 hours at 450° C., the conversion of $CF_3CH_2F$ decreased from 95% to 45%.

Example 7

Sulfated Zirconium Dioxide Catalyst

Sulfated zirconium dioxide ($ZrO_2$—$SO_4$) was prepared by slurrying 600 g of powdered zirconium hydroxide in 1.0 liters of deionized water. 100 g of a 50 wt % $H_2SO_4$ solution was added to the slurry. The solution was stirred overnight, then placed in pan in an oven and dried at 110° C. Following drying, the product material was calcined at 650° C. for 2 hours. The resulting $ZrO_2$—$SO_4$ (sulfated zirconia) powder was pressed into wafers, then crushed and sieved into 20/40 mesh catalyst particles. Sulfate was lost from the material during calcination. The sulfate content (as $SO_4^{2-}$) of the product was determined to be 3.5% using x-ray photoelectron spectroscopy.

2.0 $cm^3$ of 20/40 mesh $ZrO_2$—$SO_4$ particles described above were placed in a 1.0 cm o.d. stainless steel reactor. The reactor was heated to an elevated temperature, and the catalyst was exposed to flowing reactant (either 1,000 ppm $CF_4$ or 1,000 ppm $CF_3CH_2F$) in humid (3.0% water) air. The test with $CF_3CH_2F$ was performed with a flow rate of 300 Nml/min (GHSV of 9,000 $hr^{-1}$). The test with $CF_4$ was performed with a flow rate of 60 Nml/min (GHSV of 1,800 $hr^{-1}$). The conditions duplicate conditions of Example 5. Table 4 reports the conversion of each reactant chemical as a function of temperature.

TABLE 4

Conversion of $CF_4$ and $CF_3CHF_2$ by $ZrO_2$—$SO_4$ catalyst

| Temperature ° C. | Conversion of $CF_4$ | Temperature ° C. | Conversion of $CF_3CHF_2$ |
| --- | --- | --- | --- |
| 690 | >99% | 450 | >99% |
| 670 | >99% | 435 | >99% |
| 650 | >99% | 420 | >99% |
| 630 | 82% | 405 | 95% |
| 610 | 64% | 390 | 84% |
| 590 | 47% | 375 | 65% |
| 570 | 34% | 360 | 45% |
| 550 | 23% | 345 | 27% |
| 530 | 15% | 330 | 15% |
| 510 | 9% | 315 | 8% |

High concentrations of carbon monoxide (up to 600 ppm) were detected in the effluent stream for both compounds.

Example 8

Platinum Impregnated Sulfated Zirconium Dioxide Catalyst

The above tests were repeated for the $ZrO_2$—$SO_4$ catalyst of Example 7 impregnated with 1% by weight platinum by conventional wet impregnation techniques. The conversion of reactant chemical as a function of temperature were similar to that reported in Table 4; i.e. platinum did not affect the activity of the catalyst. However, carbon dioxide was the only carbon containing reaction product detected in the effluent stream. No carbon monoxide was detected as per the platinum-free catalyst.

Example 9

Stability of Platinum Impregnated Sulfated Zirconium Dioxide Catalyst

The 1% $Pt/ZrO_2$—$SO_4$ catalyst described in Example 8 was evaluated for stability by exposing 2.0 $cm^3$ of catalyst to 1,000 ppm $CF_3CH_2F$ in flowing humid (3.9% water) air at 300 Nml/min (GHSV of 9,000 $hr^{-1}$) at 405° C. The conversion of $CF_3CH_2F$ remained stable at greater than 94% throughout the duration of the 200 hour run.

Example 10

Aluminum Oxide—Zirconium Dioxide— Sulfate Catalyst

A 10% $Al_2O_3$—$ZrO_2$—$SO_4$ catalyst was prepared by slurrying 600 g of powdered zirconium hydroxide in 1.0 liters of deionized water in a four liter vessel. Aluminum nitrate $(Al(NO_3)_3 \cdot 9H_2O$, 24.7 g, 17 wt % $Al_2O_3$) was added to the slurry. The slurry was stirred for 1 hour. 100 g of a 50 wt % $H_2SO_4$ solution was subsequently added to the slurry. The solution was stirred overnight, then placed in pan in an oven and dried at 110° C. Following drying, the product material was calcined at 650° C. for 2 hours. The resulting $Al_2O_3$—$ZrO_2$—$SO_4$ (sulfated zirconia) was crushed and sieved into 20/40 mesh catalyst particles. Some sulfate was lost from the material during calcination. The sulfate content (as $SO_4^{2-}$) of the product was determine to be 4% using x-ray photoelectron spectroscopy.

2.0 $cm^3$ of particles were loaded into a 1.0 cm o.d. stainless steel reactor, which was placed in a tube furnace. The reactor was heated to 750° C., at which point the catalyst was exposed to 1,000 ppm $CF_4$ in flowing humid (3.0% water) air, at 60 Nml/min (GHSV of 1,800 $hr^{-1}$). The reaction temperature was then decreased at a rate of 60° C. per hour. The conversion of $CF_4$ as a function of reaction temperature is reported in Table 5.

TABLE 5

Conversion of $CF_4$ by $Al_2O_3$—$ZrO_2$—$SO_4$ catalyst

| Temperature ° C. | Conversion of $CF_4$ |
| --- | --- |
| 750 | >99% |
| 730 | >99% |
| 710 | >99% |
| 690 | >99% |
| 670 | 97% |
| 650 | 84% |
| 630 | 68% |
| 610 | 50% |
| 590 | 35% |
| 570 | 23% |
| 550 | 14% |

Example 11

Nickel—Aluminum Dioxide Catalyst

A 10% $Ni/Al_2O_3$ catalyst was prepared as follows. 1.0 kg of 6/12 mesh $Al_2O_3$ prepared according to the procedure described in Example 2 was impregnated to incipient wetness using 650 ml of a 15.4 wt % nickel solution using a spray gun. The nickel solution was prepared by placing 425 g of nickel nitrate in a 1 liter vessel, adding sufficient deionized (DI) water to bring the solution to 650 ml volume, then stirring to dissolve the salt. Following impregnation, the resulting material was dried at 55° C., then calcined by slowly heating from 55° C. to 550° C. at 1° C./minute in order to decompose the metal salt.

The 50 $cm^3$ of catalyst were evaluated stability by exposing to 2,000 ppm $C_2F_6$ using the reactor and test conditions employed in Example 4. The conversion of $C_2F_6$ remained greater than 95% throughout the duration of the 100 hour run. Carbon dioxide was the only carbon-containing product detected in the reactor effluent. No carbon monoxide was detected.

Example 12

Nickel—Zirconium Dioxide— Aluminum Oxide Catalyst

A 10% $Ni/10\%$ $ZrO_2$—$Al_2O_3$ catalyst was prepared as follows. 10% $ZrO_2$—$Al_2O_3$ was prepared by slurrying 3.0 kg pseudo-boehmite in 12 liters DI water in a 5 gallon (18.9 l) vessel. To the slurry was added 1.05 kg of zirconium oxynitrate solution (20% by weight $ZrO_2$). The slurry was allowed to mix for 6 hours using a high shear mixer. Following mixing, the slurry was aged for 12 hours. The resulting gel was then placed in an oven to dry at 110° C., then calcined by heating from 110° C. to 535° C. at 5° C./minute, maintaining the final temperature for 3 hours. The resulting solids were then crushed and sieved to 6/12 mesh.

1.0 kg of the resulting 10% $ZrO_2$—$Al_2O_3$ was impregnated to 10% by weight nickel using the solution and procedure described in Example 11.

The resulting 10% $Ni/10\%$ $ZrO_2$—$Al_2O_3$ catalyst was evaluated for stability. 50 $cm^3$ of 6/12 mesh 10% $Ni/10\%$ $ZrO_2$—$Al_2O_3$ catalyst was loaded into a 3.8 cm i.d. reactor and placed into a tube furnace. The reactor was heated to 805° C. in humid air (3.5% water) flowing at 4.5 Nl/min. Once at reaction temperature, 6.75 Nml/min each $SF_6$ and $C_2F_6$ were introduced into the humid air stream (to yield 1,500 ppm $SF_6$ and 1,500 ppm $C_2F_6$ in humid air). The conversion of $C_2F_6$ remained constant at greater than 93% and the conversion of $SF_6$ remained constant at greater than 99.5% throughout 120 hours of reaction exposure. Carbon dioxide was the only carbon-containing product detected in the reactor effluent. No carbon monoxide was detected.

Example 13

Nickel—Aluminum Oxide—Zirconium Dioxide Catalyst

A 10% $Ni/45\%$ $Al_2O_3$—45% $ZrO_2$ catalyst was prepared as follows. The $Al_2O_3$—$ZrO_2$ substrate was prepared by adding 600 g pseudo-boehmite to 10 liters DI water in a 5 gallon vessel. To the resulting slurry was added 2.1 kg of zirconium oxynitrate solution (20 wt % $ZrO_2$). The resulting gel was mixed for 6 hours, then covered and allowed to age for 18 hours at room temperature. Following aging, the resulting material was dried in an oven at 110° C., then calcined by heating to 535° C. at 5° C./minute, maintaining the final temperature for 3 hours.

The resulting material was crushed and sieved to 6/12 mesh particles. 200 g of the 6/12 mesh particles was then impregnated to 10% nickel using the procedure described in Example 11.

The 10% Ni/45% $ZrO_2$—45% $Al_2O_3$ catalyst described above was evaluated for stability by loading 50 cm³ of 6/12 mesh catalyst particles in a 3.8 cm i.d. reactor and placing the reactor into a tube furnace. The reactor was heated to 845° C. in humid air (3.5% $H_2O$) flowing at 4.5 Nl/min (GHSV=5,400 hr$^{-1}$). Once heated, $C_2F_6$ was introduced into the process stream at 9 Nl/minute, which is sufficient to achieve a concentration of 2,000 ppm $C_2F_6$ (v/v). The conversion of $C_2F_6$ remained constant at greater than 90% throughout the duration of the 100 hour reaction exposure. Carbon dioxide was the only carbon-containing product detected in the reactor effluent. No carbon monoxide was detected.

Example 14

Cobalt—Zirconium Dioxide—Aluminum Oxide Catalyst

A 30% Co/7.5% $ZrO_2$—$Al_2O_3$ catalyst was prepared as follows. 7.5% $ZrO_2$—$Al_2O_3$ was prepared according to a procedure similar to that described in Example 12. The resulting solids were crushed and sieved to 6/12 mesh.

100 g of the resulting 7.5% $ZrO_2$—$Al_2O_3$ was impregnated to 7.5% Co using a solution prepared by adding 48 g of cobalt nitrate to a 100 ml vessel. DI water was added to bring the volume to 65 cm³. The solution was heated to approximately 65° C., then used to impregnate the 100 g of 6/12 mesh 7.5% $ZrO_2$—$Al_2O_3$ to incipient wetness. The resulting material was dried, then calcined at 700° C. for 3 hours in order to allow the cobalt to complex with the substrate, as evidenced by the material turning a deep blue color. The impregnation process was repeated a total of four additional times, such that the final material was 30 wt % cobalt.

The resulting 30% Co/7.5% $ZrO_2$—$Al_2O_3$ catalyst was evaluated for stability using a mixture of $SF_6$ and $C_2F_6$. 50 cm³ of 6/12 mesh 30% $ZrO_2$—$Al_2O_3$ catalyst was loaded into a 3.8 cm i.d. reactor and placed into a tube furnace. The reactor was heated to 825° C. in humid air (3.5% water) flowing at 4.5 Nl/min. Once at reaction temperature, 6.75 Nml/min each $SF_6$ and $C_2F_6$ were introduced into the humid air stream (to yield 1,500 ppm $SF_6$ and 1,500 ppm $C_2F_6$ in humid air). The conversion of $C_2F_6$ remained constant at greater than 90% and the conversion of $SF_6$ remained constant at greater than 99.5% throughout 250 hours of reaction exposure.

Example 15

Sulfated Aluminum Oxide Catalyst $Al_2O_3$—$SO_4$ (sulfated aluminum oxide) was prepared by first adding approximately 12.0 liters of deionized (DI) water to a 5 gallon vessel and stirring with a laboratory scale mixer. 3.0 kg of pseudo-boehmite alumina (70 wt % $Al_2O_3$) was slowly added to the water while stirring. The pH of the slurry was then adjusted to approximately 3.3 using sulfuric acid, and the slurry was allowed to stir for four hours. Once complete, the slurry was covered and allowed to age for 18 hours. Following aging, the resulting gel was poured into a drying pan. The drying pan containing the gel was placed in an oven at 110° C. until dry. Following drying, the resulting solids were calcined by heating to 535° C., with the temperature maintained for three hours. Approximately 2.1 kg of product $Al_2O_3$—$SO_4$ was obtained. The resulting material was crushed and sieved to 6/12 mesh particles. Spectroscopic chemical analysis revealed the sulfate content of the resulting material to be 4.5%.

The catalyst as 6/12 mesh particles was evaluated for reactivity by placing 150 cm³ in a 3.8 cm i.d. stainless steel reactor. The stainless steel reactor was housed in a two-zone tube furnace. The catalyst was heated to 450° C. in humid air (3.1% $H_2O$) flowing at 4.5 Nl/min (HSV=1,800). Once at 450° C., 1,000 ppm (v/v) of $CHF_3$ was introduced into the process stream. This condition was maintained for one hour, at which time the catalyst temperature was decreased at a rate of 60° C./hr. Every 20 minutes (20° C. temperature intervals), the effluent stream was sampled for the concentration of carbon monoxide, carbon dioxide and $CHF_3$ using a gas chromatograph. Table 6 reports the conversion of $CHF_3$ as a function of reaction temperature.

TABLE 6

| Conversion of $CHF_3$ by $Al_2O_3$—$SO_4$ catalyst ||
|---|---|
| Temperature ° C. | $CHF_3$ Conversion |
| 510 | >99.9% |
| 490 | >99.9% |
| 470 | 98% |
| 450 | 94% |
| 430 | 82% |
| 410 | 57% |
| 390 | 32% |
| 370 | 19% |
| 350 | 9% |
| 330 | 5% |
| 310 | 2% |

Up to 500 ppm carbon monoxide was detected in the reactor effluent stream. The above test was repeated employing the catalyst described above impregnated with 1% platinum using incipient wetness techniques. Platinum did not affect the activity, however, the addition of platinum to the catalyst eliminated the presence of carbon monoxide in the effluent stream. Using the platinum impregnated catalyst, carbon dioxide was the only carbon-containing reaction product detected in the effluent stream. No carbon monoxide products of partial oxidation were detected.

Example 16

Stability of Nickel—Zirconium Dioxide—Aluminum Oxide Catalyst

The 10% Ni/10% $ZrO_2$—$Al_2O_3$ catalyst described in Example 12 was evaluated for stability in the presence and absence of water. 50 cm³ of 6/12 mesh 10% Ni/10% $ZrO_2$—$Al_2O_3$ catalyst was loaded into a 3.8 cm i.d. reactor and placed into a tube furnace. The reactor was heated to 760° C. in humid air (3.5% water) flowing at 4.5 Nl/min (GHSV=5,400 hr$^{-1}$). These process conditions were maintained for 12 hours. The catalyst was then exposed to $C_2F_6$ flowing at 4.5 Nml/min (1,000 ppm $C_2F_6$). The conversion of $C_2F_6$ remained constant at greater than 95% throughout 48 hours of reaction exposure. The catalyst was removed from the reactor following completion of the run. A portion of the sample was placed onto a sample mount and loaded into an x-ray photoelectron spectrometer. The sample was analyzed using standard XPS techniques, which revealed minimal fluorine associated with the catalyst. No aluminum trifluoride was detected.

The above test was repeated, with the exception that less than 100 ppm water was present in the process air stream. The conversion of $C_2F_6$ decreased from 55% to less than 10% over the duration of the 24 hour reaction exposure. The catalyst was removed from the reactor following completion of the run. A portion of the sample was placed onto a sample mount and loaded into an x-ray photoelectron spectrometer. The sample was analyzed using standard XPS techniques, which revealed that a portion of the aluminum had been transformed into aluminum trifluoride.

All of the compositions and/or processes disclosed and claimed herein can be made and executed without undue experimentation in light of the present disclosure. While the compositions and processes of this invention have been described in terms of preferred embodiments, it will be apparent to those of skill in the art that variations may be applied to the compositions and/or processes and in the steps or in the sequence of steps of the processes described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention.

What is claimed is:

1. A process for reducing the concentration of perfluorinated compounds or hydrofluorocarbon compounds in a sample, the process comprising:

contacting said sample with a catalyst to produce a reacted sample, wherein the catalyst consists of $Al_2O_3$, and one or more enhancers selected from the group consisting of nickel, cobalt, and sulfate.

2. The process of claim 1, wherein the concentration of perfluorinated compounds and hydrofluorocarbon compounds in the reacted sample is less than the concentration of perfluorinated compounds and hydrofluorocarbon compounds in the sample.

3. The process of claim 1, wherein the perfluorinated compounds comprise nitrogen trifluoride ($NF_3$), tetrafluoromethane ($CF_4$), hexafluoroethane ($C_2F_6$), sulfur hexafluoride ($SF_6$), octafluoropropane ($C_3F_8$), decafluorobutane ($C_4F_{10}$), or octafluorocyclobutane (c-$C_4F_8$).

4. The process of claim 1, wherein the hydrofluorocarbon compounds comprise trifluoromethiane ($CHF_3$) or 1,1,1,2-tetrafluoroethane ($CF_3CFH_2$).

5. The process of claim 1, wherein the concentration of sulfate in the catalyst is up to about 10 weight percent.

6. The process of claim 1, wherein the concentration of nickel in the catalyst is up to about 30 weight percent.

7. The process of claim 1, wherein the concentration of cobalt in the catalyst is up to about 30 weight percent.

8. The process of claim 1, wherein the nickel is selected from the group consisting of nickel oxide, nickel nitrate, and nickel acetate.

9. The process of claim 1, wherein the cobalt is selected from the group consisting of cobalt oxide, cobalt acetate, and cobalt nitrate.

10. The process of claim 1, wherein the catalyst further comprises $ZrO_2$.

11. The process of claim 1, wherein the catalyst further comprises an oxidation catalyst.

12. The process of claim 11, wherein the concentration of oxidation catalyst in the catalyst is greater 0 weight percent and less than about 10 weight percent.

13. The process of claim 11, wherein the oxidation catalyst is platinum.

14. The process of claim 11, wherein the oxidation catalyst is selected from the group consisting of palladium, rhodium, and iridium.

15. The process of claim 11, wherein the oxidation catalyst is selected from the group consisting of silver, nickel, copper, iron, vanadium, and cerium.

16. The process of claim 1, wherein the contacting step is performed at a temperature of about 150° C. to about 900° C.

17. The process of claim 1, wherein the contacting step is performed at a temperature of about 250° C. to about 700° C.

18. The process of claim 1, wherein the contacting step is performed at a temperature of about 250° C. to about 500° C.

19. The process of claim 1, wherein the sample further comprises oxygen or air.

20. The process of claim 1, wherein the sample further comprises water.

21. The process of claim 1, wherein the sample further comprises a hydrocarbon.

22. The process of claim 1, wherein the total concentration of perfluorinated compounds and hydrofluorocarbon compounds in the sample is about 50,000 ppm or less.

23. The process of claim 1, wherein the total concentration of perfluorinated compounds and hydrofluorocarbon compounds in the sample is about 20,000 ppm or less.

24. The process of claim 1, wherein the total concentration of perfluorinated compounds and hydrofluorocarbon compounds in the sample is about 5,000 ppm or less.

25. The process of claim 1, further comprising removing catalyst poisons from the sample prior to the contacting step.

26. The process of claim 1, further comprising removing hydrofluoric acid from the reacted sample.

27. A process for reducing the concentration of perfluorinated compounds or hydrofluorocarbon compounds in a sample, said process comprising:

contacting the sample with a catalyst to produce a reacted sample, wherein the catalyst consists of $ZrO_2$ and an enhancer comprising nickel.

* * * * *

Adverse Decision in Interference

Patent No. 6,673,326, Joseph A. Rossin, William B. Feaver, CATALYTIC PROCESSES FOR THE REDUCTION OF PERFLUORINATED COMPOUNDS AND HYDROFLUOROCARBONS, Interference No. 105,402, final judgment adverse to the patentees rendered January 29, 2007, as to claims 1-3 and 6-26.
*(Official Gazette March 18, 2008)*